(12) United States Patent
Avery (10) Patent No.: US 7,496,991 B2
(45) Date of Patent: Mar. 3, 2009

(54) PORTABLE SECUREMENT SYSTEM FOR EYEWEAR

(76) Inventor: Michael Scott Avery, 12940 Calais Cir., Palm Beach Gardens, FL (US) 33410

( * ) Notice: Subject to any disclaimer, the term of this patent is extended or adjusted under 35 U.S.C. 154(b) by 218 days.

(21) Appl. No.: 11/524,882

(22) Filed: Sep. 22, 2006

(65) Prior Publication Data
US 2007/0064196 A1   Mar. 22, 2007

Related U.S. Application Data

(60) Provisional application No. 60/719,170, filed on Sep. 22, 2005.

(51) Int. Cl.
A44B 21/00   (2006.01)
(52) U.S. Cl. .............. 24/3.3; 24/303; 351/158; 248/902
(58) Field of Classification Search ............... None
See application file for complete search history.

(56) References Cited

U.S. PATENT DOCUMENTS

| | | |
|---|---|---|
| 2,641,793 A | 6/1953 | Wilm |
| 2,644,212 A | 7/1953 | Markowitz |
| 2,964,812 A | 12/1960 | Cook |
| 3,159,372 A | 12/1964 | McIntosh |
| 3,178,784 A | 4/1965 | Krauthamer |
| 3,416,195 A | 12/1968 | Borthwick |
| 4,157,166 A | 6/1979 | Voelker |
| 4,325,504 A | 4/1982 | Amani |
| 5,278,591 A | 1/1994 | Trotter |
| 5,366,070 A | 11/1994 | Wolov |
| 5,654,787 A | 8/1997 | Barison |
| 5,699,990 A | 12/1997 | Seach |
| 5,732,451 A | 3/1998 | Mars |
| 5,842,613 A | 12/1998 | White |
| 5,845,369 A | 12/1998 | Dunchock |
| 5,895,018 A | 4/1999 | Rielo |
| 6,039,173 A | 3/2000 | Crow |
| 6,168,273 B1 * | 1/2001 | Dupraz et al. ............... 351/158 |
| 6,282,760 B1 | 9/2001 | Mars |
| 6,367,126 B1 | 4/2002 | Rivkin |
| 6,375,324 B2 | 4/2002 | Schleger et al. |
| 6,568,805 B1 | 5/2003 | Dietz |
| 6,904,710 B2 | 6/2005 | Lawrence et al. |
| 7,229,171 B2 * | 6/2007 | Dietz ......................... 351/112 |
| 2007/0245528 A2 * | 10/2007 | Vermillion .................. 24/3.12 |

* cited by examiner

Primary Examiner—Jack W. Lavinder
(74) Attorney, Agent, or Firm—Donald Grant Kelly (57) ABSTRACT

A portable securement system for docking eyewear to a user's garment for temporary safekeeping. Hidden in use, the system docking device is a pendant construction to be mounted on button threads behind a garment placard. There it is anchored while a magnet secured at the device's lower portion secures eyewear for easy retrieval. The docking device includes an opening at its central portion to be placed over the button, with a narrowed portion engaging the threads and serving as an anchoring trap to hold the device in place. As an alternative, a wire-like segment defines the device's central opening and terminates at opposed ends at an upper portion of the device to form a releasable clip employed to anchor the device to the garment inner seam. Eyewear is provided an appliance in the form of a flexible tube including a magnetic element to be fitted over a temple bar.

8 Claims, 5 Drawing Sheets

Fig. 14

PORTABLE SECUREMENT SYSTEM FOR EYEWEAR

REFERENCE TO RELATED APPLICATIONS

This application is entitled to the benefit of provisional patent application Ser. No. 60/719,170, filed Sep. 22, 2005; such benefit is hereby claimed under 35 USC 119(e), and the disclosure thereof in its entirety is hereby incorporated by reference. This application is related to co-pending U.S. patent application Ser. No. 11/524,886, concurrently filed on Sep. 22, 2006.

STATEMENT REGARDING FEDERALLY SPONSORED RESEARCH OR DEVELOPMENT

Not applicable

REFERENCE TO SEQUENCE LISTING

Not applicable

BACKGROUND OF THE INVENTION

1. Field of the Invention

This invention relates to the field of supports and holders for implements, particularly magnetic elements facilitating temporarily securement of personal items to a garment base or the like for storage, safekeeping and easy access as needed.

2. Description of Related Art

Various alternatives currently exist for transporting and keeping a users eyewear when not being worn, yet having it readily available when needed. One of the most common methods of transport is the use of the shirt or pants pocket, but the eyewear tends to tumble out, become scratched or bent. A flexible open-ended case or pocket protector, sometimes equipped with a pocket clip, is widely used to overcome this problem, but these are bulky and often heavier than the eyewear itself. Hinged cases that are fully closed for storage have been found less than satisfactory, as well.

Eyeglass cases or sleeves and the like are generally bulky and unflattering when carried in a pocket. Materials used to fabricate such cases may include leather or vinyl and thus do not permit adequate air flow when stored in a pocket. This, of course, results in a user's undesirable heat retention and perspiration leading to damage or soiling of the case. More often than not, the user will choose to avoid a storage case altogether and instead insert their eyewear directly into a pocket, if a pocket is available. Hazards of doing this are mentioned above.

A majority of sport shirts, tee shirts, aprons and blouses do not include pockets. The option of carrying a pair of eyeglasses in a pocket associated with trousers too frequently results in ink-stained fabric or abrasions to the eyeglass lenses imparted by loose change, keys and the like. In addition, eyewear frames too often are subjected to bending or breaking when the user stoops or sits.

The same can be said when a pens eyewear is stored unprotected and commingled in a purse, handbag or briefcase. Hard-shell, hinged cases are available for protection, but are bulky and demand a significant amount of space. Wearing a pair of eyeglasses tethered or otherwise attached to retainers such as straps, chains or the commonly known "croakies" offers convenience, but may also be perceived as an annoyance or even tacky. As an example, attention is directed to Barison's U.S. Pat. No. 5,654,787 showing a portable securement device in the form of eyeglasses temple mounted dips which appear to slide over the ends of the temples.

Over the years, magnets have been employed as portable securement devices to hold jewelry, pins or brooches on garments. For example, Borthwick's U.S. Pat. No. 1,416,195 shows an early use of a magnet to secure a corsage in place without damaging garment fabric. Unfortunately, securement parts are subject to being lost.

More recently the U.S. Pat. No. 6,282,760 issued to Mars shows a brooch having a magnet embedded therein so as to be held against clothing by internally mounted magnetic element. Another patent issued to Mars, U.S. Pat. No. 5,732,451, describes a jewelry holder for non-invasive attachment to a garment where paired magnets grip fabric therebetween so as to hold the jewelry in place. One magnet of the pair includes a passage for a jewelry pin serving to hold the jewelry thereto. Here, too, parts may be easily displaced or lost.

Items such as pencils and pens also have been altered or equipped so as to render them securable through the use of magnets. Krauthamer's U.S. Pat. No. 3,178,784 teaches a portable magnetic securement system mounted on a pencil and attached to removable base in the form of a sheet metal strip mounted on clothing pocket. Mcintosh's U.S. Pat. No. 3,159,372 presents another magnetic pencil holder where the magnetic element has a slot for pencils and the like and attaches, for example, to a metal frame of a table. These ancillary devices are obtrusive and unattractive.

Cook illustrates yet another portable securement device for holding a pencil on a support which is magnetically held to a base. See Cook's U.S. Pat. No. 2,964,812. A portable securement system in the form of a sleeve mounted on a pencil is taught by Markowitz (U.S. Pat. No. 2,644,212), where the sleeve includes a magnet embedded therein and a cooperative magnet holder element clips to a garment. Cook's device also is obtrusive and unattractive.

Rielo's U.S. Pat. No. 5,895,018 shows a holder for magnetically supporting lightweight articles of thin pliable material (such as kitchen towels) to a magnetic surface. Rielo employs a pair of magnet-holding fastening plates attached so as to retain the pliable material therebetween for subsequent placement against the magnetic surface. Similarly, Wiln's U.S. Pat. No. 2,641,793 presents a potholder with an embedded magnet for temporary storage on metal support. Rielo and Wiln either damage or severely alter the articles to which their devices are applied.

A number of patented devices addresses the need for safely and conveniently storing eyeglasses (as well as other items) when not in use. For instance, the patent granted to Lawrence et al., U.S. Pat. No. 6,904,710, discloses apparatus for securing an object to a support utilizing magnetic elements. As an example, Lawrence et al. show a pair of spectacles including a magnet disc secured by a narrow flexible loop to a temple portion of the spectacles. The prominent and highly visible magnet disc of Lawrence et al. is shown altered to include decorative indicia or image on its outer surface. The user may temporarily store the folded spectacles by placing them on ferrous, magnetic surfaces such as a refrigerator door. There is no attempt to make the securement system subtle or blended into the spectacle temple.

Dietz, in U.S. Pat. No. 6,568,805, depicts magnetic elements affixed at the midpoints of eyeglasses temple bars such that the magnetic elements are aligned when folded or closed for storage. When folded together, the magnets are attracted to each other and form a clamp to temporarily secure folded eyeglasses temples onto clothing fabric. The magnetic elements are secured to the temple bars in a variety of ways. Their constant magnetic attraction when folded may be found to be annoying to the user and less than satisfactory. Dietz offers little more than the widespread method of hanging the eyeglasses temple bar in a pocket or shirt button placard.

Schleger et al. illustrates eyeglasses temple bars with tips that incorporate magnet elements as presented in U.S. Pat. No. 6,375,324. These magnet elements, rather than relating to temporary storage or holding of the eyeglasses when not being born, are for health-related treatment and are equally spaced bio-magnets providing a magnetic field to the wearer's head. There appears to be no mention of eyeglasses storage as far as Applicant can discern.

Another eyewear holder is taught by Rivkin, U.S. Pat. No. 6,367,126, wherein two magnets are affixed outside the fabric of a wearer's clothing. These two magnets are held in place by a magnetically saturable keeper plate just inside the fabric. A bridge connection extended between the magnets forms a loop through which an eyewear temple bar may be inserted for temporary storage. This device is decidedly bulky and obtrusive.

In the disclosure of Dupraz et al., U.S. Pat. No. 6,168,237, an apparatus is described for facilitating temporary storage of eyeglasses on a non-ferrous base. At least one magnetic element is associated with the eyeglasses frame by gluing, screwing, crimping or the like. For example, the magnetic element can be forced into a hole (e.g., a through-hole or blind-hole) provided in any of the components of the frame. When it is desirable to store eyeglasses to a support base of non-ferrous material such as a fabric garment, aluminum bicycle frame or car dashboard, a magnetic keeper base may be provided. Ferrous metal (magnetically attracted material) and magnet components may be reversed in application as desired. The holding devices of Dupraz et al. are prominent and obtrusive, and the fabric mount is invasively damaging.

U.S. Pat. No. 6,039,173 issued to Crow presents another method of temporarily supporting eyeglasses when not in use. Crow's holder may be fixed, as by taping, to a storage point such as a computer monitor or vehicle dashboard. The holder includes a conduit into which a free end one temple bar or stem may be inserted for securement. Crow's device is purposely obtrusive and would not readily adapt to use with garments.

U.S. Pat. No. 3,845,369 granted to Dunchock presents a holder in the form of a pin structure mounted on clothing fabric and including a loop through which an eyeglasses temple bar may be inserted for temporary storage. White's U.S. Pat. No. 5,842,613 illustrates and describes a holder for eyeglasses wherein the holder is to be positioned in a garment pocket. Dunchock's device is invasive and fabric damaging.

U.S. Pat. No. 5,699,990 issued to Seach presents a mounting base for temporarily holding eyeglasses wherein the base includes a space accommodating an eyeglasses temple stem. Wolov, in U.S. Pat. No. 5,366,070, illustrates a device for securing a pen to a pen securement area utilizing hook and loop fasteners.

The U.S. patent issued to Trotter (U.S. Pat. No. 5,278,591) shows a spectacle temple stem holder clip for securement of the spectacles within a pocket. Trotter's accessory kit further includes a tether line to permit remote mounting of the eyeglasses as well as a fiber optic cable to direct illumination forwardly of Trotters eyeglasses framework. Amani's U.S. Pat. No. 4,325,504 presents a tubular sleeve for a user's wrist, wherein the sleeve is formed to include a magnet for retaining magnetically holds ferrous elements in wrist-mounted container U.S. Pat. No. 4,157,166 issued to Voelker presents another obtrusive eyewear holder having a hole for encircling a rearview mirror post on an automobile. The holder further includes a pair of holes permitting insertion therethrough of the temple piece of an eyeglasses frame. In lieu of the hole for encircling a mirror post, an alternative embodiment includes a magnet for securing the holder to a magnetic base.

With general reference to the prior art as discussed hereinabove, it is apparent that a market exists for an innovative securement system that would serve to safely and conveniently store items such as eyewear, pens, pencils and so forth, and do so in a dependable, non-invasive, aesthetic and unobtrusive manner. The prior art, while trying to solve this problem, fails for a variety of reasons.

Prior art devices are seen in many cases as inappropriate for portable personal use and non-adaptable for use in association with clothing. Those that are adapted to personal portability are obtrusive and unfashionable in appearance or deleterious to garment fabric when utilized. Further, it is important that the system be portable and easily put into use as required. Moreover, it is crucial that use of securement system avoid adverse impact on fabrics with which it may be associated or utilized.

The problem takes on new dimensions with an aging demographic, particularly with respect to vast population growth among people with increasing need for reading glasses. What is needed is a simple, easy to use securement system or docking device that can employ the recently developed high-strength magnet devices for storing implements such as eyewear, pens and so forth directly to a garment for ready access. Further needed is a simple and reliable appliance for eyewear that makes it magnetically attractive to a metallic base or magnet securement system. A combination of the two (the portable securement docking device and the modified eyewear) must be fashionably subtle, yet consistently dependable. During use, such a system should be essentially invisible to the casual observer.

It will become apparent from reading the present disclosure that Applicant's novel invention resolves the disadvantages inherent with pre-existing alternatives and methodologies. The present invention further affords greater convenience and economy of motion. With the use of this inventive portable securement system for eyewear, the simple act of depositing eyewear against one's clothing (or other convenient location) takes less effort than stowing the eyewear away or placing the eyewear on a table or countertop—perhaps to be misplaced or even permanently lost.

BRIEF SUMMARY OF THE INVENTION

A principal objective of the present invention is to provide a portable securement system for temporarily or indefinitely retaining eyewear on a users' garments or the like in such a way as to have a non-invasive or damaging impact on the garments themselves as well as the eyewear.

The invention presently described and claimed is a combination of two docking device components, together comprising a portable securement system for eyewear. In the present context eyewear is considered inclusive of eyeglasses, spectacles, sunglasses or shades, bifocals, sunshade clip-on, and the like. While focused on the problems of safe and convenient eyewear storage, the system components described herein may clearly enjoy application relative to a wide variety of personal items requiring temporary securement on a non-magnetic substrate such as fabric of a garment, so as to be safe and handy when needed. The two major components of the inventive combination will now be described.

The portable securement system of the present invention includes, as one component thereof, a first docking device equipped for attracting and securing eyewear possessing magnetic properties so as to secure the eyewear relative to a nonferrous surface base such as a shirt, blouse, or other garment. This will render the secured items readily available on demand. A second system component, referred to as the second docking device, comprises a novel adapter or ancillary feature provided for eyewear. This adapter is particularly applicable for eyewear fabricated of material lacking magnetic properties but also is applicable to eyewear with magnetic properties.

A distinct advantage in the design of the inventive components of the portable securement system is that the application and function thereof avoids having to employ epoxy, solder, weld, adhesive tape, molding or gluing techniques, screws, pins, bolts or other conventional fasteners which would have abusive, invasive or otherwise damaging impact on the garment or the eyewear to be docked thereon.

System components include a first and second docking device. The first docking device is described as having a pendant construction. In the present context, the term pendant is intended to mean: something suspended from something else (*The American Heritage® Dictionary of the English Language*, Fourth Edition). The first docking device includes an upper attachment part for anchoring to a garment, and a generally downwardly depending or suspended lower part to which is affixed a magnet. This docking device is herein presented as possessing two embodiments with minor variations therebetween.

A first embodiment (of the first docking device) includes an open loop defined by lateral sides, said loop having a relatively narrow upper portion opening in the form of a channel interconnected to a relatively wider central portion opening. The narrower upper portion opening acts as a trap or detent configured to non-invasively engage garment button threads for anchoring the device against movement relative to the garment. Affixed to said lower part of the pendant construction is a relatively powerful magnet to which magnetic implements may be temporarily held.

Similarly, a second embodiment (of the first docking device) also is formed as a pendant construction to include an upper attachment or anchoring part from which is suspended a lower part. In this instance, these upper and lower docking device parts are fabricated from a wirelike material (where the term wirelike is defined as including wire and wirelike material that may be similarly deformed, and hereafter referred to simply as "wire") of a predetermined, finite length. The wire is deformed to create a magnet-holding area at the docking device lower part and a central loop defined by the flexibly opposed wire sides at the upper attachment part.

The loop in this second embodiment (of the first docking device) has a narrower upper portion to optionally serve as an anchoring detent essentially identical to the function of the first embodiment. More significantly, the wire terminates at two opposed ends at their upper extremity, thereby forming a spring biased clip operable by pressing the opposed wire sides.

Thus, opposing wire ends of the embodiment act as an expansible clip or grabber. Finger pressure on opposing wire sides provides sufficient force to spread apart the wire segment's upper ends. This separation results in the opposing wire ends forming a clip or grabbing area to be directly clipped to garment parts (particularly internal parts of the garment fabric such as seams or internal pleats), or placed around button threads as noted above.

Upon release of pressure, a spring-like memory characteristic of the wire permits biased movement of the opposing wire ends into engagement with the garment part or parts. Thus, the docking may be attached at a point on or within a garment and suspend generally downward from said point, supporting the magnet at its lower portion.

As noted above, this novel portable securement system comprises a unique combination of two components. The first docking device fabricated (in two embodiments) for attachment to a user's garment or other convenient location has just been briefly described as the first of the two system components. The second component of the combination is the unique eyewear temple bar appliance referred to now as the second docking device.

The second docking device includes a temple bar appliance in the form of a tubular sleeve element designed to fit or envelop over at least one eyewear temple bar (which, by the way, are also commonly known in the art as frame sides, temples, and stems). The tubular sleeve is applied in such a way as to be stylishly unobtrusive, yet accommodating or including at least one magnetic element therein. The tubular sleeve may be a flexible natural rubber substance or can instead be formed of a variety of synthetic materials such as Vinyl or Latex. The flexible sleeve is generally elongated to smoothly adapt to the look and form of existing temple bar design. The sleeve has an opening in at least one end thereof for accommodating insertion of an eyewear temple bar. In every instance, the flexible sleeve or tube will include a magnet or magnetically attractive element therein or thereon.

In one embodiment the elongated flexible sleeve has two open ends so as to be positioned anywhere along the full length of an eyewear temple bar. This tube is flexible enough to have a magnetic element inserted therein along with the bar. In another embodiment, the tube is closed and formed to substitute as a temple tip, but including therein or thereon a magnetic element.

Magnets for these docking device embodiments may, for example, comprise neodymium, also called a neo magnet with more detail to follow herebelow. The magnet arrangements described could further include what is commonly known in the field as a magnet booster useful to meet more demanding performance requirements or heavier loads.

These relatively small magnets may be connected to their associated securement devices only through magnetic attraction, depending on the nature of the material from which the securement system device is fabricated. Alternatively, these magnets may be affixed or mechanically connected in place through metallic or epoxy bonding, mechanical wrapping, mechanical fasteners, gluing, welding, crimping or other suitable, equivalent fastening techniques.

BRIEF DESCRIPTION OF THE DRAWINGS

The invention will be best understood by reference to the following detailed description of an illustrative embodiment when read in conjunction with the accompanying drawings, wherein.

DETAILED DESCRIPTION OF THE INVENTON

Details of the present invention are provided for purpose of illustration and disclosure, but are not intended as exhaustive or limited to the invention in the form disclosed. Many modifications and variations of the inventive device will be apparent to those of ordinary skill in the art.

Personal implements, particularly eyewear generally required by users to be easily accessible as needed, may be docked or temporarily secured through use of the novel portable securement system presented and described herein. This inventive system is especially unique in the manner in which a portion thereof can be anchored to a user's garment such as a shirt, sweater, dress or the like. The present system further includes a novel eyewear adapter element that uniquely collaborates with the securement docking device. Description of this inventive combination will begin with details of the securement docking device in two embodiments.

Figures 1, 2:
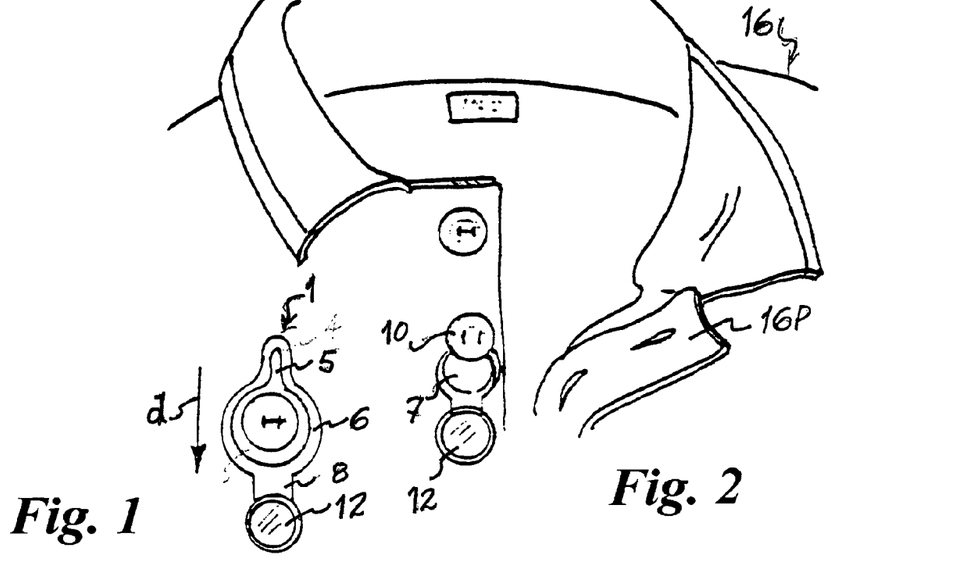
FIG. 1 illustrates a plan view of a first embodiment of the first docking device shown in position to be slid down onto a garment button for temporary attachment thereto.
FIG. 2 shows a front perspective of a garment (e.g., shirt or blouse) having attached thereto the docking device depicted in FIG. 1, wherein the device repositioned downwardly so as to temporarily, connectively engage a button of said garment.

FIG. 1 shows a first embodiment of a portable securement system docking device 1 in the form of a pendant construction. Docking device 1 includes a first or upper part 4 having sides 6, and a lower part 8. This device 1 may be molded, machined, stamped or otherwise manufactured of any suitable material (metal, plastic, natural substance, and the like or a combination thereof).

The sides 6 are fabricated or shaped so as to define a generally central loop or opening 7 of a predetermined dimension adequately sized to accommodate being placed over a typical garment button 10 as viewed in FIG. 2. Typical garment buttons may range in size from around one-fourth inch up to as much as one inch in diameter; however, most are in the range of three-eight inch to one-half inch in diameter.

Figure 3:
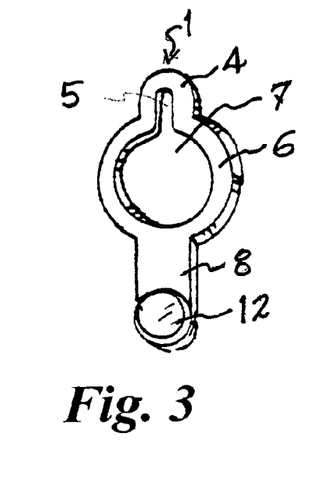
FIG. 3 shows a clarifying front perspective of the docking device of FIGS. 1 and 2.

A first or upper part 4 of said docking device 1, as more clearly demonstrated by FIG. 3, is fabricated or shaped so as to define a first or upper opening 5 as an upward extension of opening 7 and characterized as having a predetermined dimension. The predetermined dimension of said upper opening 5 is seen as distinctly narrower than the predetermined dimension of said central opening 7.

When said portable securement system device 1 is placed against a garment 16 (see FIG. 2) such that the central opening 7 surrounds button 10 and lowered in direction d, the threads securing button 10 to garment 16 are confined in the narrower opening 5 which thus serves as an anchor trap or detent anchoring the pendant construction of said securement system device 1 against movement relative to garment 16.

A relatively small magnet 12 is attached to the third or suspended lower part 8 of portable securement system device 1 and is thus suspended generally below the threads of button10. Attachment of magnet 12 may be accomplished through magnetic attraction (depending on the magnetic nature of the material from which lower part 8 is fabricated). Alternatively, such attachment may be accomplished by epoxy or metal bonding, mechanical wrapping, mechanical fasteners, gluing, welding, crimping or equivalent fastening technique.

Figures 6, 7A, 7B, 8:
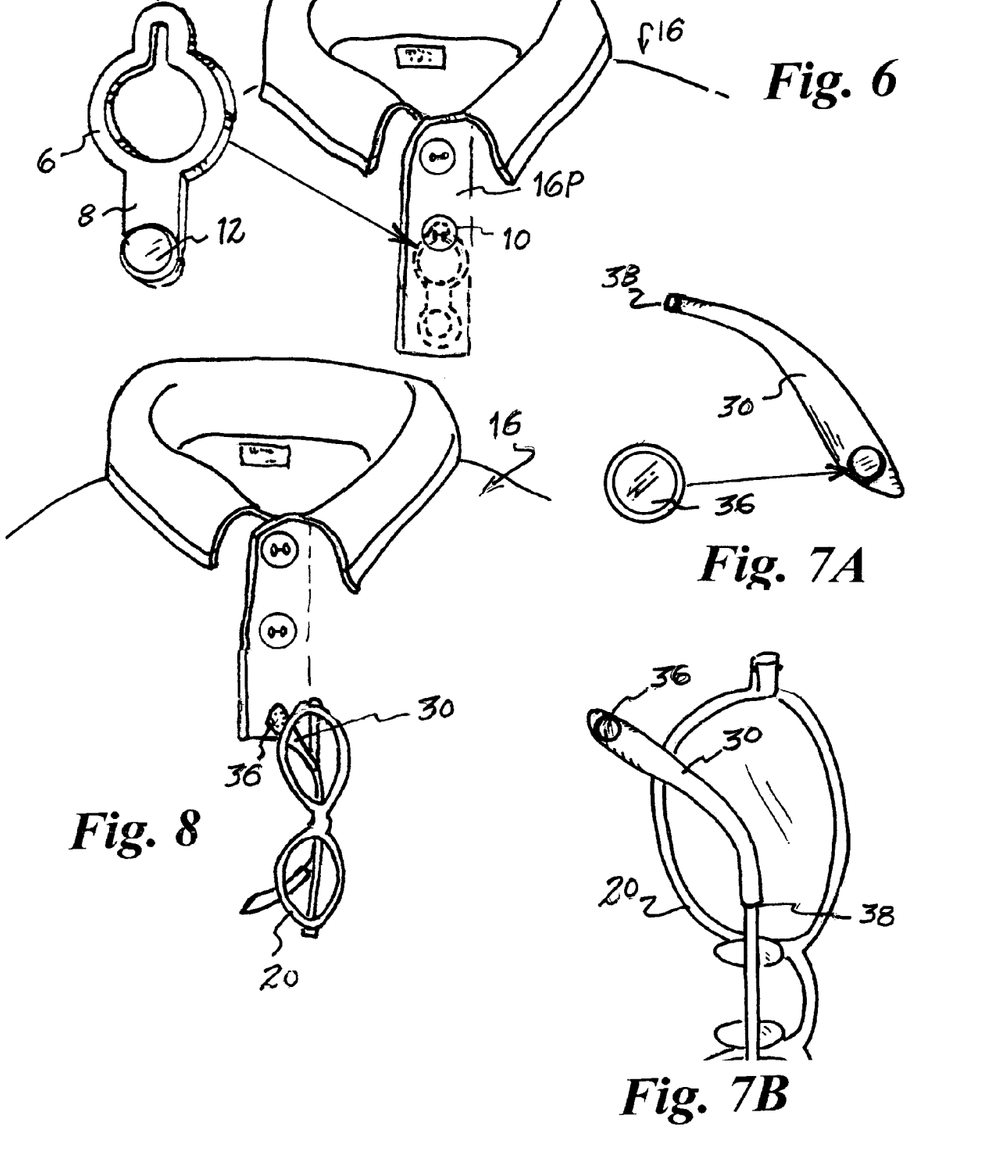
FIG. 6 is a front perspective view illustrating a garment on which is temporarily affixed a first embodiment of the first docking device, illustrated as obscured by a garment placard.
FIG. 7A shows an illustration of a first embodiment of the second docking device, specifically a plan view of a tubular sleeve simulating a temple tip and including a magnetic element shown ready for placement on an eyewear temple bar.
FIG. 7B illustrates a plan view of eyewear in which a tubular sleeve with magnet element has been placed over the temple bar.
FIG. 8 presents a front perspective of eyewear enhanced by the unique tubular sleeve and docked upon a "hidden" portable securement docking device.

As noted, the weight of magnet 12 acts to pull the upper part 4 and opening 5 defined therein generally downwardly and into anchoring engagement with button 10. When the placard 16p of garment 16 is closed into buttoning position as shown in FIG. 6 the portable securement system device 1 (indicated by phantom lines) is hidden from view. This affords a uniquely neat appearance with the portable securement system clearly unobtrusive and without invasive, damaging impact to the garment 16 fabric. FIGS. 7A and 7B respectively illustrate a flexible sleeve or tubular member 30 for a temple bar. The sleeve 30 in this instance is obviously in the form of a replacement temple tip, and is seen as including a magnet 36 (which may be either inside our outside the sleeve 30). FIG. 8 illustrates the neat and unobtrusive interconnection of the sleeve-equipped eyewear 20 docked or magnetically engaged at the securement device hidden behind placard 16P.

A user, with a single direct motion, may place eyewear directly against (or merely near) hidden securement system device 1. When juxtaposed to magnet 12, such items are immediately drawn into place for temporary securement. The addition of magnet 36 to this combination makes for a powerful and dependable combination particularly useful where thick fabrics such as woven wools or fleece are involved.

When called upon, an easy tug on the docked eyewear will remove it from securement. When wearing the sleeve-equipped eyewear the added appliance will go unnoticed especially if it is at a location behind the ear. And, unlike so many prior art devices, no damages are imparted to the fabric and magnetic securement elements are not misplaced loosely within the garment. Next to be described is a similarly functioning alternative or second embodiment of the present invention.

Depicted in FIGS. 4 and 5 and FIGS. 9-11 is the second embodiment of portable securement system docking device also of a pendant construction. Portable securement system device 1' may be fabricated from a durable material that is spring-like (i.e., the material can be flexed or bent, yet possesses mechanical memory when deformed so as to recover its pre-flexed shape and position). For example, device 1' may be formed of a single, finite segment of metal wire with a pair of ends 18 opposed at a gap therebetween. The portable securement system device 1' further includes a first or upper part 4' with sides 6' and lower part 8'.

Lower part 8' of the second embodiment includes a magnet 12 affixed thereto. In the second securement system device embodiment illustrated in FIG. 5, magnet 12 is shown as held captive or mechanically gripped within bend 9 of the metal wire segment. Of course, additional or other fastening techniques as described above may be utilized as necessary. A mechanical crimp 14 can be applied at lower part 8' to stabilize and strengthen docking device 1'. Other crimping or stabilizing equivalents may obviously be employed as well.

Figure 4:
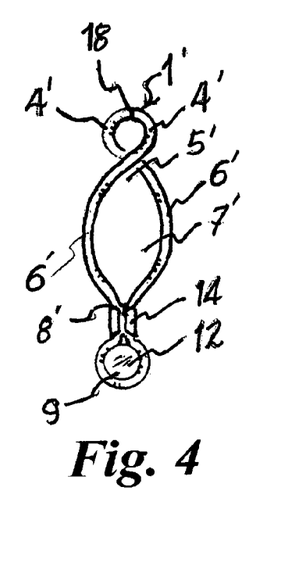
FIG. 4 illustrates a plan view of a second embodiment of the first docking device presented in closed position.

Opposing sides 6' of said second embodiment portable securement system device 1' define a loop 7'. It will be evident from the drawings that loop 7' narrows at an upper portion thereof into an upper opening area designated 5' similar to narrow opening portion 5 described above. So formed, this area 5' can, when required, serve as a trap or detent anchoring the device against movement relative to the garment to which it is mounted. Opposing sides 6' may be curved as shown in FIG. 4 or could be configured in the irregular polygonal shape depicted as sides in FIG. 9. In either case, the sides 6' extend above loop 7', crossing one another as shown so as to form a clip with first and second opposing segment ends 18 yieldably pressed together.

Figure 5:
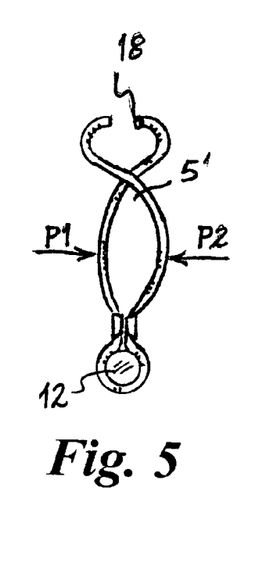
FIG. 5 illustrates a plan view of the second embodiment (of FIG. 4) presented here in open or unclamped position.

More specifically, wire segment sides 6' may be pressed and released such that opposing wire ends 18 are respectively opened and closed to comprise a spring-bias anchor clip. As illustrated in FIG. 5, finger pressure (P1, P2) on the opposing curved sides 6' provides sufficient force to open the gap at wire ends 18 to facilitate clipping of the portable securement docking device 1' to garment parts, particularly internal parts of the garment fabric such as a seam, hem, pleat, lining and so forth. The weight of the lower portion 8' and magnet 12 keeps the docking device oriented below the upper portion 4' when in use, thus keeping its hidden position predictable to the user when docking implements thereon.

Figures 9, 10, 11:
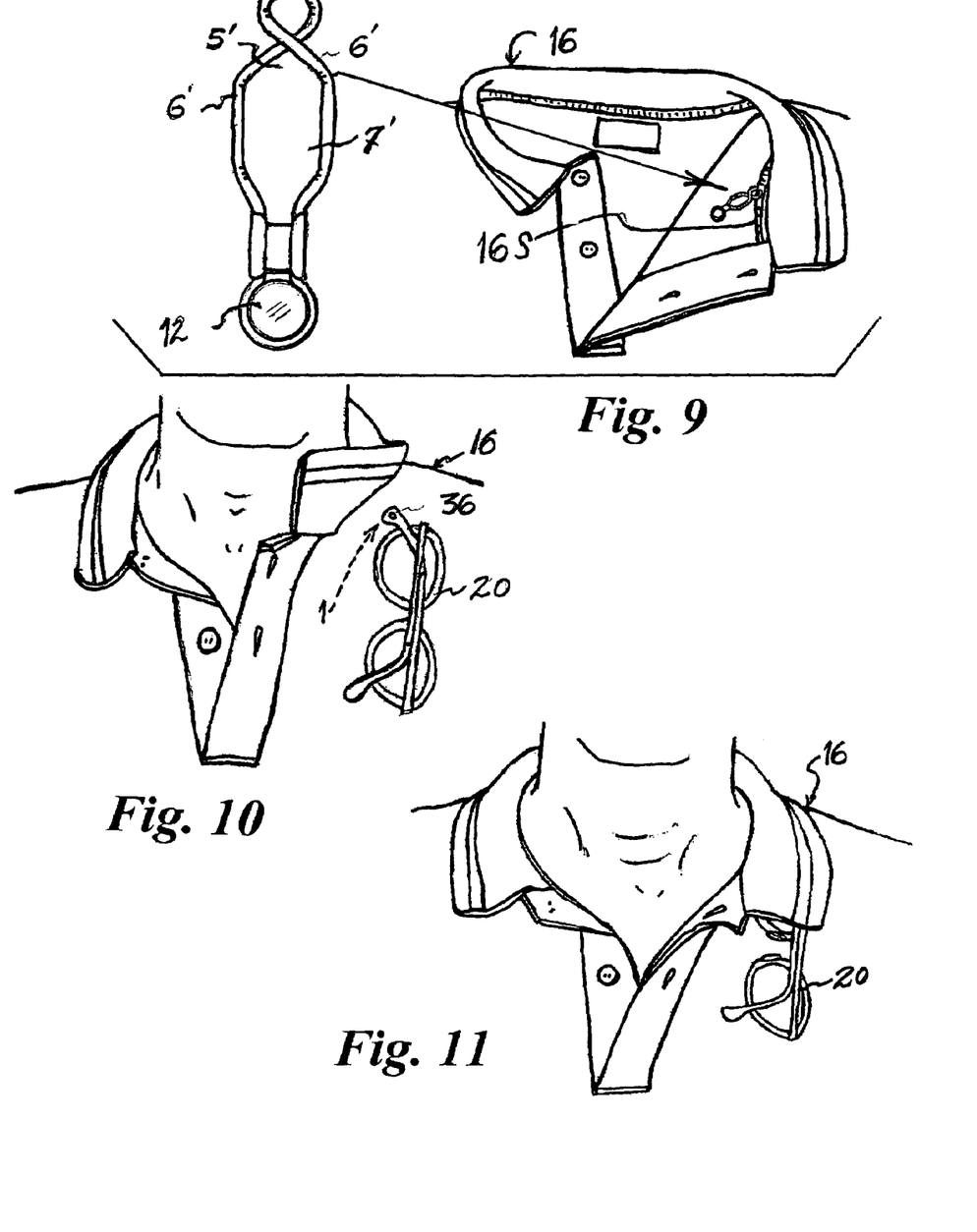
FIG. 9 is a view of the second embodiment of the first docking device component in its position affixed within a garment.
FIG. 10 is a view of eyewear equipped with a replacement temple tip and magnet held in place on a garment through attraction of the second embodiment of portable securement system (hidden within the garment) affixed to a garment inner seam.
FIG. 11 is a view similar to FIG. 10, but with a garment collar portion folded downward so as to partially cover the secured eyewear.

As presented in FIG. 9, the second embodiment of portable securement device 1' is temporarily clipped to garment 16 at an inner seam 16S thereof. Once secured, device 1' serves as a securement docking point for any metallic element or implement including but of course not limited to eyewear and the like whether or not they include magnets mounted thereon.

Once the device 1' is in place, the placard may be closed and eyewear to be secured thereon are simply placed at or near the hidden docking device 1' such that the magnetic attraction draws the implements into securement. Again, the eyewear may be retrieved as needed, and with only a slight tug from the user. By way of example, FIG. 10 illustrates the mounting of eyewear 20 placed on the securement system device 1' (position indicated by dash-line), and FIG. 11 shows the garment 16 collar folded to partially cover the secured eyewear.

It should be noted that the second embodiment security system device 1' is applicable to buttons in essentially the same manner described relative to the first embodiment device 1. Opening 7' as shown in FIGS. 4 and 9 includes a loop 7' permitting its placement over a button 10 (though not shown). The device 1' is then lowered so as to engage the button thread within an upper narrowed opening 5'. In yet another application, the clip formed by upper loop 4' at wire ends 18 could be secured around button threads so as to be anchored thereon.

Figure 12:
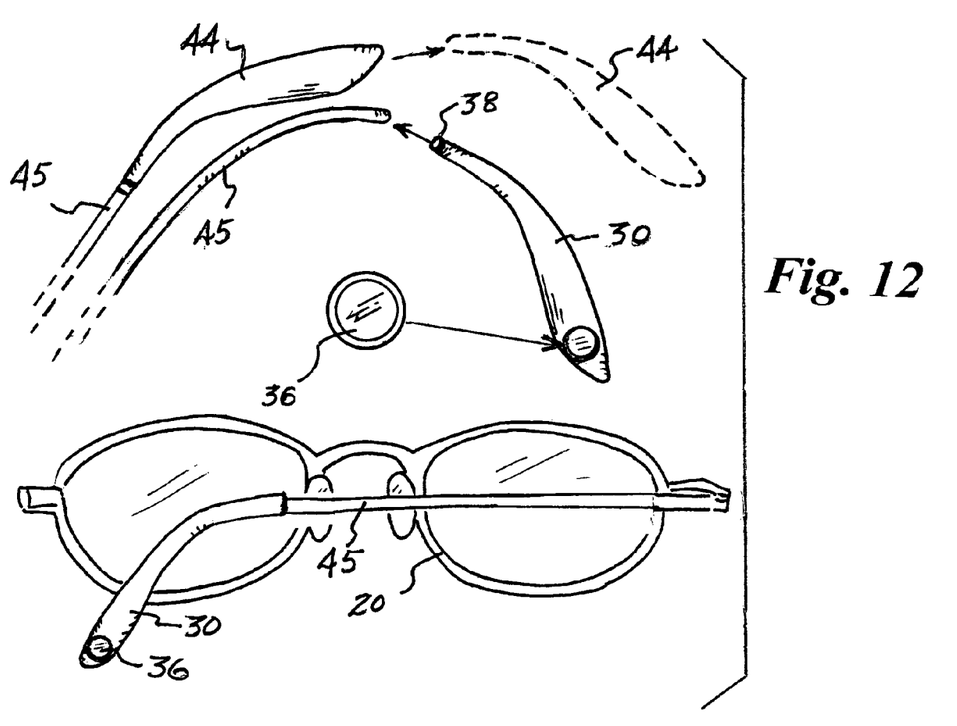
FIG. 12 illustrates the assembly process for adding a docking device in the form of a temple tip with magnet to an eyewear temple bar.

FIG. 12 illustrates the steps of removing a standard temple tip 44 from eyewear 20 and replacing it with a flexible tube sleeve 30 (open at both ends) equipped with a metallic element 36 which may be a magnet. Removal of most standard temple tips is fairly easy, particularly when first placed under hot running tap water for a short period. Sleeve 30 fits over temple bar 45, as shown.

Figure 13:
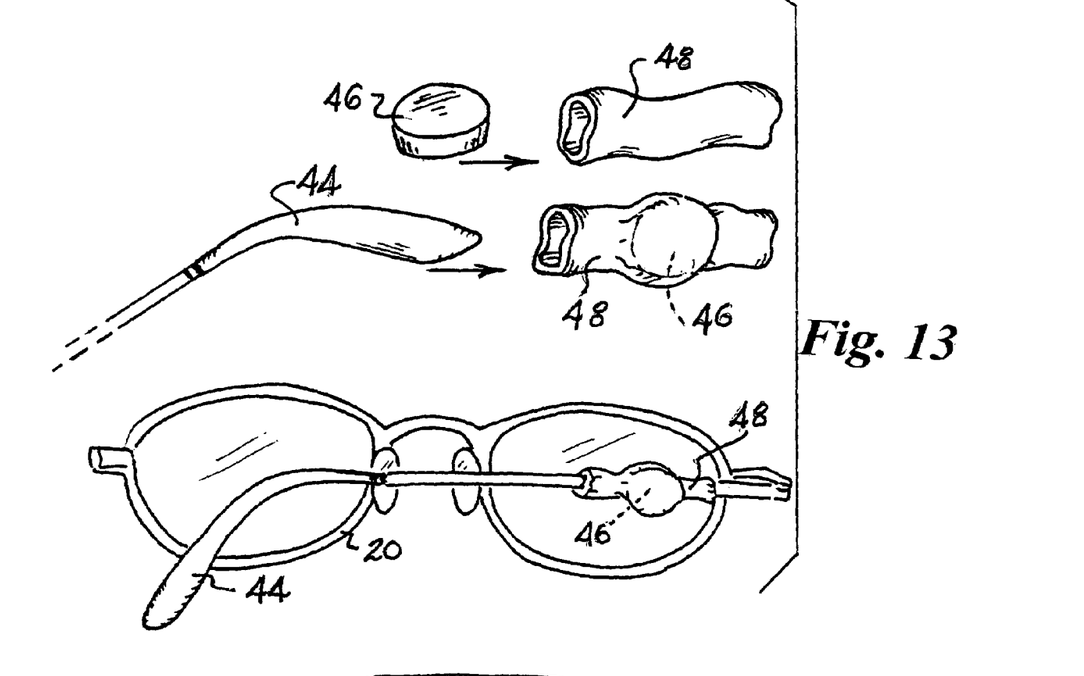
FIG. 13 illustrates the assembly process for adding a tubular sleeve and magnet to an eyewear temple bar.
Figure 14:
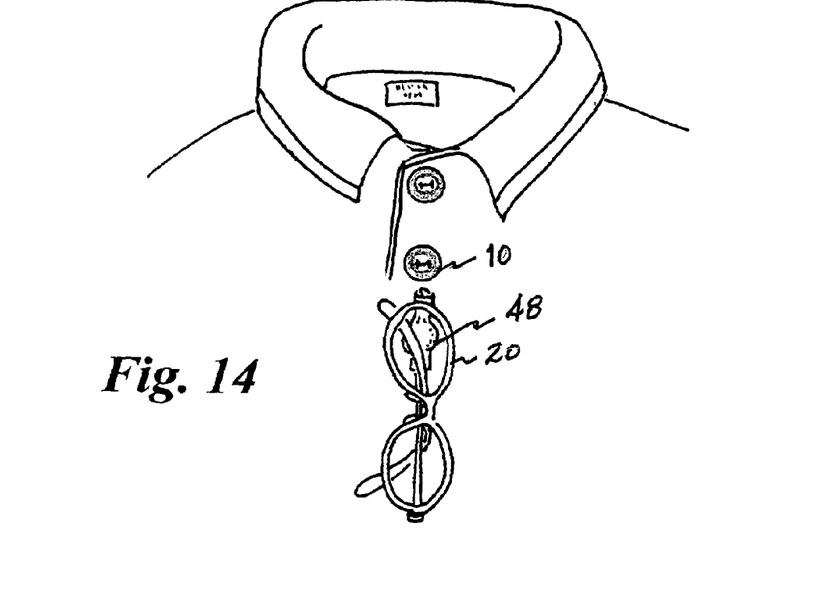
FIG. 14 shows the eyewear of FIG. 13 docked to a garment.

FIG. 13 shows assembly of a magnet or magnetic element 46 within flexible sleeve 48 which in turn is slid over temple tip 44 and positioned anywhere along temple bar 45. FIG. 14 demonstrates the utility of this embodiment where the magnet holding sleeve 48 is positioned for securement with a portable securement device hidden behind placard 16P. Note that this sleeve 48 and magnet 46 are shown for clarity in an exaggerated form. In reality the magnetic element 46 can be quite small and the tubular sleeve very narrow and form fitting relative to the temple bar. In addition, the sleeve may be provided a color that matches the temple bar.

A distinct advantage of this latter tube embodiment is that it may be positioned behind the user's ear and thus out of site and conveniently moved to the front end of the eyewear frame so as to form a magnetic mounting base for a small work light, reading lamp or other lightweight appliances. Further, this eyewear appliance when equipped with a suitably powered magnet will facilitate the user's "parking" of eyewear on any convenient metallic surface as for example kitchen appliances, TV cabinet, metal shelving, metal doorframe, auto dashboards, computer monitors and so forth.

For all practical purposes, magnets and ferrous/magnetic components described herein may be reversed in application. In other words, where an implement to be secured is itself (in whole or in part) a magnet, the magnet 12 (previously described as) attached to device 1 or 1' may be replaced by a ferrous metal element capable of attraction to said magnet implement.

Thus, the present invention can be conveniently modified as appropriate by simple replacement of the magnets 12, 36 with a non-magnet yet "magnetic" element. The term "magnetic" is intended to carries the conventional meaning that a magnetic element may possess properties of a magnet or the capability of being attracted to a magnet.

The present invention commands a level of magnetic attraction or "pull power" typical of powerful rare-earth permanent magnet compositions. Widely known examples are neodymium-iron-boron formulations, or NdFeB. These neodymium-iron-boron formulations have been available for such applications only for the past several years, and are known to be fabricated in the shape of rods, blocks, rings, disks and cubes. By way of example only, such magnet elements may be of the neodymium-iron-boron formulation believed to be available as "NdFeB grade 35" from Forcefield Magnets, Inc.

Magnet elements 12, 36 are illustrated herein as relatively small discs. Importantly, the present invention is not limited to any specific shape, grade, power or strength, as long as it is adequate to its task. Furthermore, when necessary, the magnetic force of the portable securement may be readily increased through the addition of a "booster" magnet that is simply magnetically applied to the existing magnet 12, 36 and still considered within the scope of the present invention.

Although the portable securement device described above can be worn with numerous types of garments, a sport shirt (of the polo type) has been employed herein to demonstrate its intended use. This choice is in no way intended as limiting the scope of the present invention and the myriad of applications it can enjoy.

Again, there are several ways to affix the portable securement docking device either to the inside or outside of the garment, depending upon the user's own preference. In each case, the device and all associated components of the present invention will be found to be remarkably unobtrusive. In use this system remains secure from accidental detachment and its application will impart no damage to garment fabric.

Although various embodiments have been described in the foregoing detailed description and illustrated in the accompanying drawings, it will be understood that the invention is not limited to the embodiments disclosed, but may assume numerous arrangements, rearrangements, modifications and substitutions of elements without departing from the spirit of the invention nor from the scope of the claims which follow.

I claim:

1. A portable securement system for temporarily securing eyewear having temple bars relative to a garment, said system including:
    a first docking device having a pendant construction including an upper anchoring part and a suspended lower part;
    said upper part of said first docking device including lateral sides defining in said upper portion a first opening;
    said first opening in said upper part of said first docking device having an upper extreme and a central area;
    said first opening is narrower at its upper extreme than at its central area, said narrower upper extreme forming a trap to anchor said securement device on a part of said garment;
    the lower part of said pendant construction includes a magnet for attracting said eyewear to be secured thereto;
    a second docking device including a temple bar appliance to be fitted on said eyewear, said appliance comprising an elongated flexible tubular sleeve;
    said sleeve having a first end and a second end wherein at least one of said ends is open for receiving said eyewear temple bar;
    said sleeve further incorporating therein a magnetic element;
    whereby said upper part of said first docking device may be anchored to a part of said garment while said magnet depends generally therebelow to attract said magnetic element within said second docking device, thus temporarily securing said eyewear for easy retrieval as needed.

2. The portable securement system of claim 1 further characterized by:
    said trap is a channel defined by said lateral sides at said first opening upper extreme and directly communicating with said first opening;
    whereby said first opening may be placed over a garment button and lowered thereon so as to engage said channel with button threads and thus anchor said pendant construction in place generally above said magnet.

3. The portable securement system of claim 2 further characterized by:
    said elongated flexible tubular sleeve is closed at said second end thereof;
    said magnetic element is positioned at said closed second end.

4. The portable securement system of claim 3 wherein said magnetic element is affixed to said second end of said sleeve.

5. The portable securement system of claim 2 further characterized by:
    the first end and second end of said elongated, flexible tubular sleeve are open;
    said magnetic element is loosely positioned within said tubular sleeve between said first and second end;
    whereby said sleeve and magnetic element may be placed on an eyewear temple bar so as to cooperate with said portable securement system device in temporarily docking said eyewear.

6. A portable securement system for temporarily securing eyewear having temple bars relative to a garment, said system including:
    a first docking device having a pendant construction including an upper anchoring part and a suspended lower part;
    said upper part of said device including lateral sides defining in said upper portion a first opening;
    the lower part of said pendant construction includes a magnet for attracting said eyewear to be secured thereto;
    a second docking device including a temple bar appliance configured to be fitted on said eyewear, said appliance comprising an elongated flexible tubular sleeve;
    said sleeve having a first end and a second end wherein said first end is open for receiving said eyewear temple bar and said sleeve second end is closed;
    said sleeve further incorporating therein a magnetic element positioned adjacent the second end of said sleeve;
    said lateral sides of said portable securement device being formed of a flexible wirelike segment defining said upper portion first opening;
    said wirelike segment characterized as having mechanical memory when deformed;
    said lateral sides extend above said upper portion first opening, crossing one another to form a clip having first and second opposed wirelike segment ends yieldably pressed together, such that a user's pressure on said lateral sides serves to separate said opposed segment ends and relief of said pressure permits the opposed segment ends to press together forming a trap to anchor said system device in place on said garment;
    said wirelike segment being a single continuous segment extending from said first opposed segment end around said magnet and returning to terminate at said second opposed segment end;
    said wirelike segment mechanically confines said magnet;
    whereby said upper part of said first docking device may be anchored to a part of said garment while said magnet depends generally therebelow to attract said magnetic element within said second docking device, thus temporarily securing said eyewear for easy retrieval as needed.

7. The portable securement system of claim 6 wherein said magnetic element is affixed to said second end of said sleeve.

8. A portable securement system for temporarily securing eyewear having temple bars relative to a garment, said system including:
    a first docking device having a pendant construction including an upper anchoring part and a suspended lower part;
    said upper part of said device including lateral sides defining in said upper portion a first opening;
    the lower part of said pendant construction includes a magnet for attracting eyewear to be secured thereto;
    a second docking device including a temple bar appliance to be fitted on said eyewear, said appliance comprising an elongated flexible tubular sleeve having a first end and a second end;
    the first end and second end of said elongated flexible tubular sleeve are open for receiving said eyewear temple bar;
    said sleeve further incorporating therein a magnetic element;
    said magnetic element is loosely positioned within said tubular sleeve between said first and second ends such that said sleeve and magnetic element may be placed on said eyewear temple bar so as to cooperate with said portable securement system device in temporarily docking said eyewear;
    said lateral sides being formed of a flexible wirelike segment defining said first opening;
    said wirelike segment characterized as having mechanical memory when deformed;

said sides extend above said first opening, crossing one another to form a clip with first and second opposed segment ends yieldably pressed together, wherein a user's pressure on said sides serves to separate said opposed segment ends and relief of said pressure permits the opposed segment ends to press together forming a trap for anchoring said first docking device in place on said garment;

said wirelike segment being a single continuous segment extending from said first opposed segment end around said magnet and returning to terminate at said second opposed segment end;

said wirelike segment mechanically confines said magnet; whereby said upper part of said first docking device may be anchored to a part of said garment while said magnet depends generally therebelow to attract said magnetic element within said second docking device, thus temporarily securing said eyewear for easy retrieval as needed.

* * * * *